(12) United States Patent
Lütke-Bexten et al.

(10) Patent No.: US 7,399,013 B2
(45) Date of Patent: Jul. 15, 2008

(54) BUMPER FOR A MOTOR VEHICLE

(75) Inventors: Ulrich Lütke-Bexten, Paderborn (DE); Michael Roll, Bielefeld (DE); Elmar Mollemeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/463,440

(22) Filed: Aug. 9, 2006

(65) Prior Publication Data

US 2007/0040398 A1 Feb. 22, 2007

(30) Foreign Application Priority Data

Aug. 18, 2005 (DE) .................. 10 2005 039 489

(51) Int. Cl.
*B60R 19/03* (2006.01)
*B60R 19/12* (2006.01)

(52) U.S. Cl. ........................ 293/102; 293/155

(58) Field of Classification Search ............... 293/102, 293/120–121, 133, 149, 151–153, 155
See application file for complete search history.

(56) References Cited

U.S. PATENT DOCUMENTS

| | | | | | |
|---|---|---|---|---|---|
| 4,029,350 | A | * | 6/1977 | Goupy et al. ............... | 293/110 |
| 4,408,790 | A | * | 10/1983 | Shimoda et al. ............. | 293/122 |
| 5,123,688 | A | * | 6/1992 | Takado et al. ............... | 293/120 |
| 5,154,462 | A | * | 10/1992 | Carpenter .................... | 293/120 |
| 6,502,874 | B2 | * | 1/2003 | Kajiwara et al. ............. | 293/133 |
| 6,764,119 | B2 | * | 7/2004 | Bladow et al. ............... | 293/155 |
| 6,971,690 | B2 | * | 12/2005 | Evans et al. .................. | 293/102 |
| 2004/0262931 | A1 | * | 12/2004 | Roussel et al. ............... | 293/120 |

FOREIGN PATENT DOCUMENTS

| | | | | |
|---|---|---|---|---|
| DE | 2407440 | * | 8/1975 | ................ 293/120 |
| DE | 29 36 827 A1 | | 4/1981 | |
| DE | 690 02 741 T2 | | 8/1993 | |
| DE | 196 43 049 A1 | | 4/1998 | |
| DE | 699 02 294 T2 | | 7/2002 | |
| DE | 101 35 903 A1 | | 2/2003 | |
| DE | 102 29 600 A1 | | 1/2004 | |
| WO | WO 00/32444 | * | 6/2000 | |

\* cited by examiner

*Primary Examiner*—Dennis H Pedder
(74) *Attorney, Agent, or Firm*—Henry M. Feiereisen

(57) ABSTRACT

A bumper for a motor vehicle includes a cross member which is disposed transversely to side rails of a motor vehicle frame and connected to the side rails via crash boxes. The cross member has a C-shaped cross section and includes an outer shell member and an inner shell member. The inner shell member is constructed as tension link which is made of a material having a tensile strength that is greater than the tensile strength of a material of the outer shell member.

16 Claims, 4 Drawing Sheets

BUMPER FOR A MOTOR VEHICLE

CROSS-REFERENCES TO RELATED APPLICATIONS

This application claims the priority of German Patent Application, Serial No. 10 2005 039 489.2, filed Aug. 18, 2005, pursuant to 35 U.S.C. 119(a)-(d), the content of which is incorporated herein by reference.

BACKGROUND OF THE INVENTION

The present invention relates to a bumper for a motor vehicle.

Nothing in the following discussion of the state of the art is to be construed as an admission of prior art.

Bumpers for motor vehicles are constructed to prevent damage to the vehicle body structure in the event of a crash or impact at low speed (up to 16 km/h) and directly affect the type of damage to a vehicle and the damage assessment. As a result, the construction of bumpers is used for categorizing vehicles in certain insurance classes. The lower the expected repair costs in the event of a collision, the better the insurance classification.

Bumpers are typically arranged across the front and rear of a motor vehicle and include a cross member which is coupled to the side rails of the vehicle body via crash boxes. The crash boxes may also form part of the side rails and are configured in this case as repair solution. Oftentimes, the cross member has a hat-shaped profile having flanks that can be connected by a closing metal sheet to prevent inversion of the flanks. Also known are cross members in the form of single-cell or multi-cell extruded or rolled profiles.

Bumpers are currently tested by offset barrier crash tests, whereby in the event of a front-offset crash test the vehicle strikes a barrier that is slanted by 10°, whereas in the event of an rear-offset crash, the vehicle is hit by an impact car which strikes the test vehicle at an angle of 10° in relation to the vehicle length axis. In view of the design of current vehicles, the barriers strike directly the crash boxes so that the main work, i.e. almost the entire energy, must be absorbed in these crash tests by the crash boxes. The cross member assumes hereby the task to provide in further test requirements, such as the pendulum test, sufficient support to the pendulum and to ensure the integrity between the crash boxes and side rails in the event of high-speed crashes.

Conventional bumpers suffer shortcomings because in order to meet the standards of older or current crash repair tests, their overall weight has increased in an undesired manner.

It would therefore be desirable and advantageous to provide an improved vehicle bumper which obviates prior art shortcomings.

SUMMARY OF THE INVENTION

According to one aspect of the present invention, a bumper for a motor vehicle includes a cross member disposed transversely to side rails of a motor vehicle frame and connected to the side rails via crash boxes, wherein the cross member has a C-shaped cross section and includes an outer shell member and an inner shell member, with the inner shell member constructed as tension link which is made of a material having a tensile strength which is greater than a tensile strength of a material of the outer shell member.

The present invention resolves prior art problems by constructing the cross member as a combination of two shell members, instead of the conventional single-shell cross member. In this way, the tensile integrity relevant for the crash repair test between the crash boxes can be realized solely by the inner shell member so that the outer shell member can be designed minimally while still meeting a support function of an outer plastic skin as well as satisfying the requirements of the so-called pendulum test by which slight impacts during parking or collisions at a speed of 2.5 km/h to 8 km/h can be simulated. A bumper according to the invention has the advantage of encountering in the event of an impact at low speeds of under 4 km/h only minimal damage that can easily be repaired, because the parts of the bumper are held together preferably by screwed connections. In other words, single parts can easily be replaced. Repair costs are thus low and insurance classification of vehicles equipped with a bumper according to the invention is more beneficial to the consumer. Material use can also be kept to a minimum while still meeting the required standards. As a consequence of the functional separation between the inner and outer shell members, it is not only possible to use materials of different tensile strength but materials can be utilized that have different specific weight. Thus, a bumper according to the invention can be made lighter overall in comparison to a conventional single-shell bumper or bumper of uniform material.

According to another feature of the present invention, the inner shell member may be made of steel material, e.g. super high strength steel, and the outer shell member may be made of lightweight metal, e.g. aluminum, or plastic. The use of aluminum for the outer shell enables a significant reduction in the overall weight of the bumper, while the use of super high strength steel as material for the inner shell member ensures optimum properties. Although an inner shell member of steel is under certain circumstances as heavy as or even heavier than the outer shell member despite its shorter dimensions, overall a bumper according to the invention exhibits better crash behavior at reduced total weight in order to meet the required standards.

In a crash repair test, the inner shell member is primarily responsive to a tensile stress and to a much lesser degree to bending stress. By constructing the inner shell member in a generally C-shaped configuration, the depth of the structure, as measured in travel direction, can be made significantly smaller compared to conventional single-shell constructions. In addition, also the height of the inner shell member can be significantly reduced. As a result of the smaller dimensions, it is possible to arrange the inner shell member at a distance to the outer shell member over a major part of its central length portion which extends between the crash boxes. In particular the distancing in vertical direction is relevant here. In other words, the inner shell member does not function as closing metal sheet but, in fact, as a distinct additional cross member that primarily ensures the tensile integrity between the crash boxes and the side rails in a high-speed crash test.

According to another feature of the present invention, the inner shell member may be fully received within the outer shell member for space-saving reasons. It is then possible to jointly secure the inner shell member and the outer shell member to the crash boxes. Suitably, the deformation elements of the crash boxes engage in the outer shell member because of a steep force increase in the event of an impact. In order for the crash boxes to be able to engage as deeply as possible into the hat-shaped outer shell member, the inner shell member may also have a generally C-shaped configuration, defined by a web, which confronts the outer shell member, and opposite legs, which are connected to the web and angled in a direction to the crash boxes, with the legs embracing the crash box and being respectively connected to a top side and a bottom side of the crash box. In this way, the crash boxes not only engage the outer shell member but also the inner shell member. The distance between the front-side web of the outer shell member and the front-side end surface of the crash boxes can be minimized and the desired steep force increase can be realized.

According to another feature of the present invention, the inner shell member has a central length portion and end portions for attachment of the inner shell member to the crash boxes, wherein the end portions have a height which is greater than a height of the central length portion and corresponds to the height of the crash boxes. The height in the area of the end portions is solely determined by the height of the crash boxes. To avoid stress peaks within the inner shell member configured as tension link, the height of the central length portion gradually increases in a transition zone to the end portions. In the absence of stress peaks, material use and total weight of the bumper may be optimized.

According to another feature of the present invention, the web of the inner shell member may be formed in an area of the end portions with an opening which extends to the transition zone and has a rounded configuration in an area proximal to the central length portion so that the end portion is forked to define an upper arm and a lower arm. The opening may be sized large enough to clear almost the entire end surface of the crash boxes. This allows attachment of a towing apparatus in the area of the crash boxes and in addition results in material saving and weight reduction. For reasons of stability, it may be suitable to interconnect the ends of the upper and lower arms by a vertical link.

In correspondence to the waisted configuration of the inner shell member, it is also possible to construct the outer shell member with a midsection which extends between the crash boxes and has a height which is smaller than a height in an area of the crash boxes. This, too, results in material saving and weight reduction.

According to another feature of the present invention, the inner shell member has a length dimension which may be shorter than a length dimension of the outer shell member. The shorter overall length of the inner shell member is possible because it absorbs only tensile stress so that there is no need to extend the inner shell member laterally beyond the crash boxes.

According to another feature of the present invention, the outer shell member has attachment zones which embrace the end portions of the inner shell member so that the inner and outer shell members can be connected to the crash boxes by common fastening bolts. This reduces assembly and disassembly of the bumper.

In general, it is sufficient for the inner and outer shell members to touch one another only in an area of the crash boxes. In the area of the crash boxes, the attachment zone of the outer shell member may be pressed against the arms in the end portion of the inner shell member so that the inner shell member is clamped between the outer shell member and the crash box, when the bumper is assembled. Further direct contact surfaces between the inner and outer shell members are not required. In certain cases, it may be suitable to provide at least one support member for prop up of the outer shell member in its midsection in relation to the inner shell member. This indirect contact between the shell members contributes to an overall stiffening of the bumper. The support member may be designed, for example, in the form of a metal sheet that bridges the distance between the inner and outer shell members.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
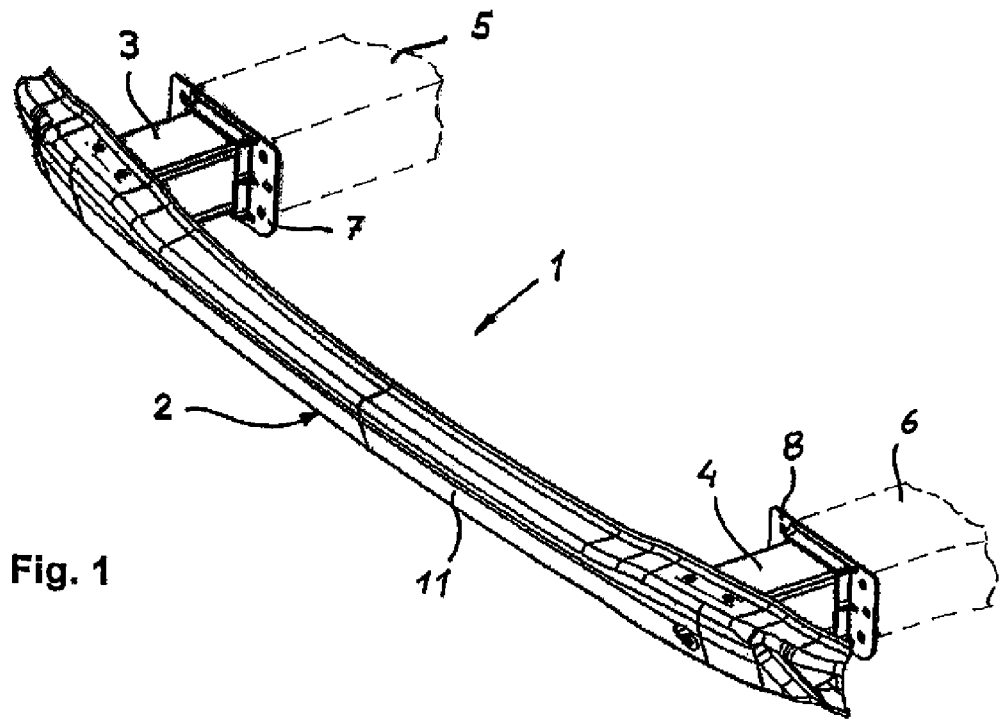
FIG. 1 is a top, front and side perspective view of a bumper according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top, front and side perspective view of a bumper according to the present invention, generally designated by reference numeral 1, for a motor vehicle. The bumper 1 includes a cross member 2 which is mounted via crash boxes 3, 4 to side rails 5, 6 of the vehicle frame. As shown in particular in FIG. 2 by way of example, the crash boxes 3, 4, have a two-chamber configuration and are made of aluminum. The crash boxes 3, 4 are secured to flange plates 7, 8 of aluminum die casting which in turn are intended for securement by bolts to the side rails 5, 6.

The cross member 2 of the bumper 1 is made in the form of a two-shell structure, having an outer shell member 9 and an inner shell member 10 which is disposed within the outer shell member 9. The inner shell member 10 is made of high strength steel material, and the outer shell member 9 is made of aluminum. Despite its greater dimensions, the outer shell member 9 has approximately a same weight as the inner shell member 10, when the outer and inner shell members have identical wall thickness. The outer shell member 9 and the inner shell member 10 of the cross member 2 assume different tasks. The inner shell member 10 primarily assumes the transfer of a tensile load between the crash boxes 3, 4 and therefore does not need to extend beyond the crash boxes 3, 4. In other words, the inner shell member 10 is shorter in length than the outer shell member 9.

Figure 3:
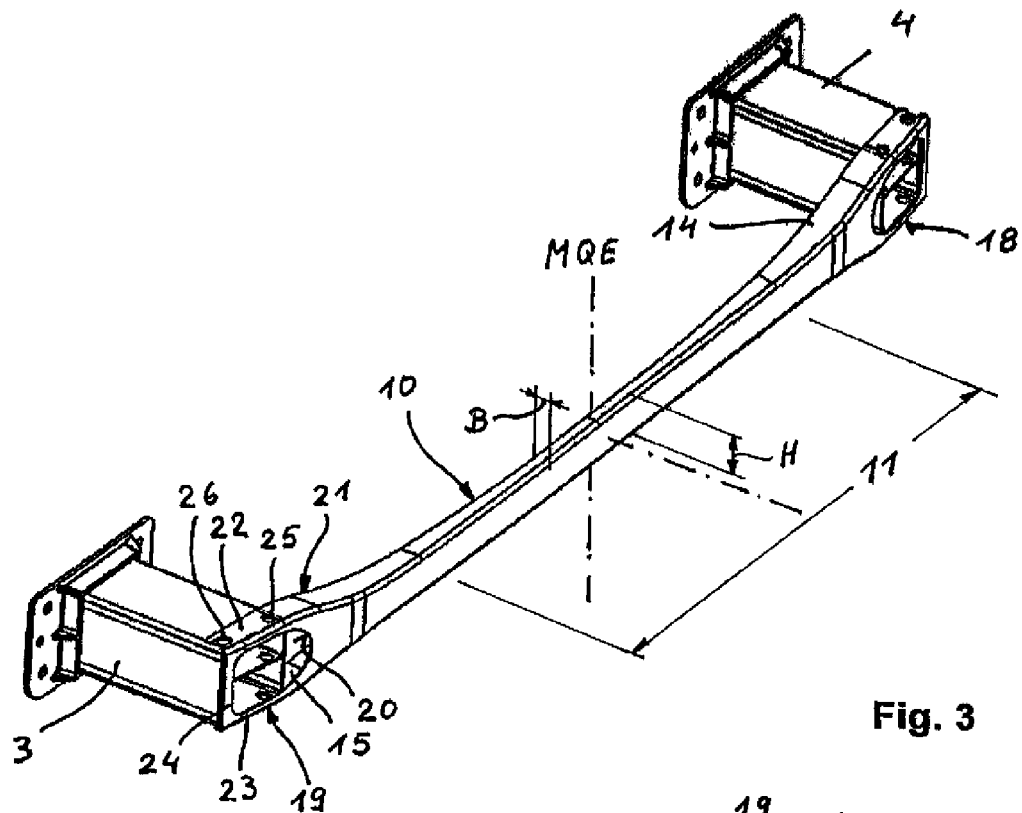
FIG. 3 is a top, front and side perspective view of an inner shell member of the bumper of FIG. 1.
Figure 4:
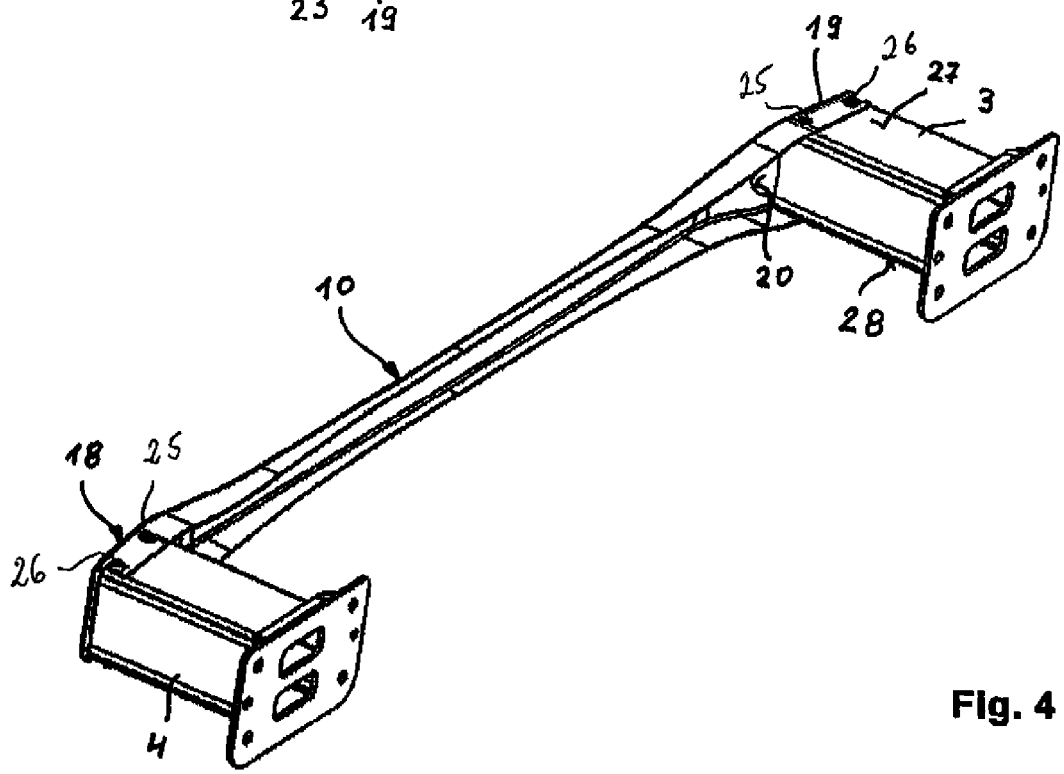
FIG. 4 is a top, rear and side perspective view of the inner shell member of FIG. 3.
Figure 5:
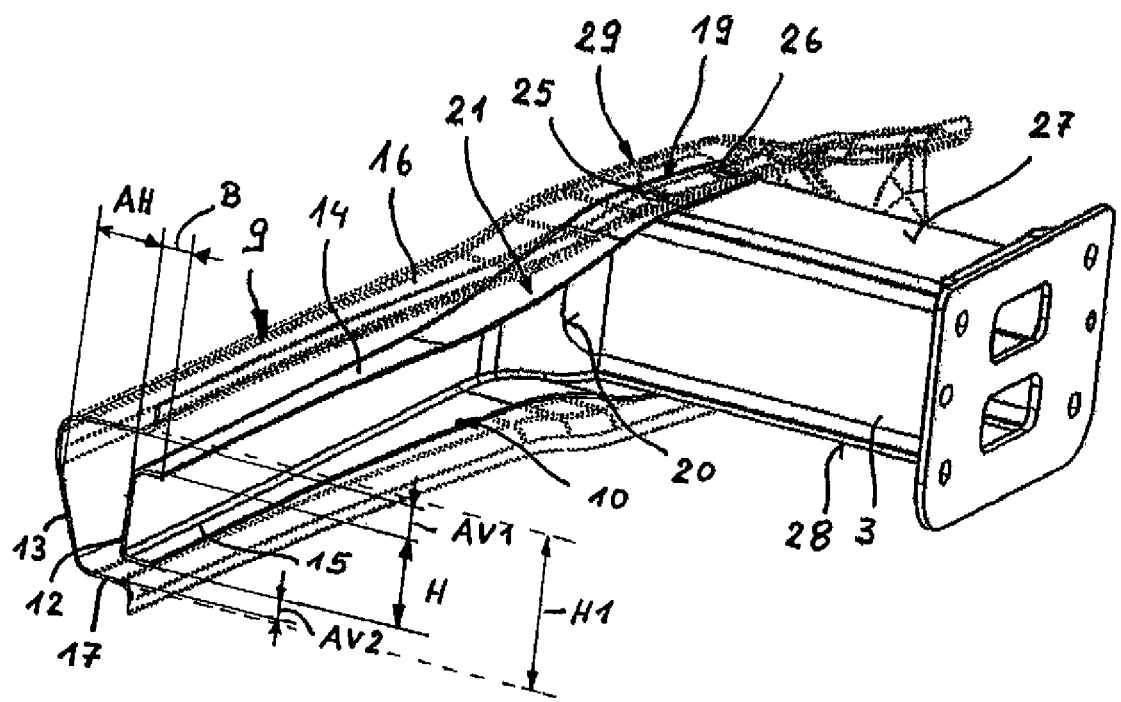
FIG. 5 is a top, rear and side perspective view of a portion of the bumper in an area of the right crash box.

The outer shell member 9 has a generally C-shaped or hat-shaped configuration and includes a web 13 and upper and lower legs 16, 17 which respectively extend from the web 13 in confronting relationship to the crash boxes 3, 4, as shown in particular in FIG. 5. The upper and lower legs 16, 17 have ends which are turned out in opposite direction to one another. Likewise, as shown in FIGS. 3, 4, the inner shell member 10 has a C-shaped cross section, defined by a web 12, which faces the outer shell member 9, and two legs 14, 15 which extend respectively from the web 12 towards the crash boxes 3, 4 at an angle. The inner shell member 10 has a central length portion 11 which extends between the crash boxes 3, 4 and has a height H and a width B which are considerably smaller than the height and width in a midsection 30 of the outer shell member 9 which surrounds the inner shell member 10 on three sides. The central length portion 11 of the inner shell member 10 extends over a major part thereof at a horizontal distance AH to the outer shell member 9. As shown in FIG. 5, the distance AH is measured in travel direction between the web 12 of the inner shell member 10 and the web 13 of the outer shell member 9. In view of the angular relationship between the webs 12, 13, the distance AH varies in dependence on the height H. FIG. 5 shows clearly the presence of the horizontal distance AH and the presence of vertical distances AV1 and AV2 between the upper and lower legs 14, 15 of the inner shell member 10 from the upper and lower legs 16, 17 of the outer shell member 9, respectively. The vertical distance AV1 between the upper legs 14 and 16 differs hereby from the distance AV2 between the lower legs 15 and 17. In the shown exemplified embodiment of the bumper 1, the vertical distance AV1 is greater than the vertical distance AV2.

As shown in FIGS. 3 and 4, the width B as well as the height H of the inner shell member 10 in relation to the transverse center plane MQE increases in the direction to end portions 18, 19 of the inner shell member 9. The height H is hereby at a minimum in the transverse center plane MQE and corresponds in the area of the end portions 18, 19 to the height of the crash boxes 3, 4. Both, height H and width B may double in size from the transverse center plane MQE to the end portions 18, 19.

The end portions 18, 19 are so configured as to allow engagement of the crash boxes 3, 4 between the legs 14, 15 so that the inner shell member 10 does not generate an additional deformation space anteriorly of the plane defined by the end surfaces of the crash boxes 3, 4 but rather ensures the tensile integrity between the crash boxes 3, 4.

As shown in particular in FIG. 3, the end portions 18, 19 of the inner shell member 10 are each formed with an opening 20 which is sized to extend to a transition zone between the central length portion 11 and the end portions 18, 19, respectively. The width B and the height H of the inner shell member 10 increase gradually in size in the transition zone 21. As a result of the opening 20 in each of the end portions 18, 19, the end portions 18, 19 assume a fork-like configuration to define an upper arm 22 and a lower arm 23. In the non-limiting example shown here, the upper and lower arms 22, 23 are interconnected at their ends by a vertical link 24 so that the opening 20 is bounded on all sides. The opening 20 is shaped in such a manner that a side which extends into the area of the transition zone 21 is rounded while the other three sides are essentially rectilinear. The stress patterns in the bumper 1 allow the presence of a rounded side of the opening 20 because the tensile forces encountered in the inner shell member 10 are introduced solely across the arms 22, 23 in the crash boxes 3, 4. The central area of the end portions 18, 19 is subject to little stress so that this area can be covered by the opening 20. As a result, the weight of the bumper 1 is reduced, without weakening the structure.

As further shown in FIGS. 3 and 4, the arms 22, 23 have each an inner bore 25 and an outer bore 26, with the outer bore 26 being open to the outside so that the arms 22, 23 receive a forked configuration. Main tensile forces are transmitted across fastening bolts 31 which are placed through the inner bore 25 and the multi-chamber profile of the crash boxes 3, 4. The clamping forces applied by the fastening bolts 31 are sufficient for force transfer in the area of the outer bores 26.

Figure 2:
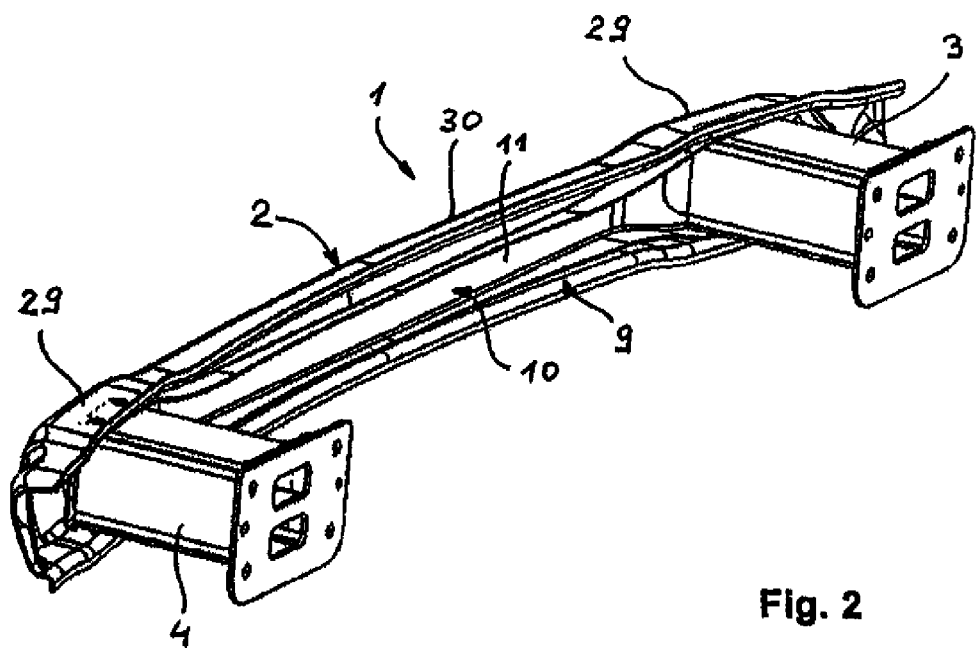
FIG. 2 is a top, rear and side perspective view of the bumper of FIG. 1.
Figure 1A:
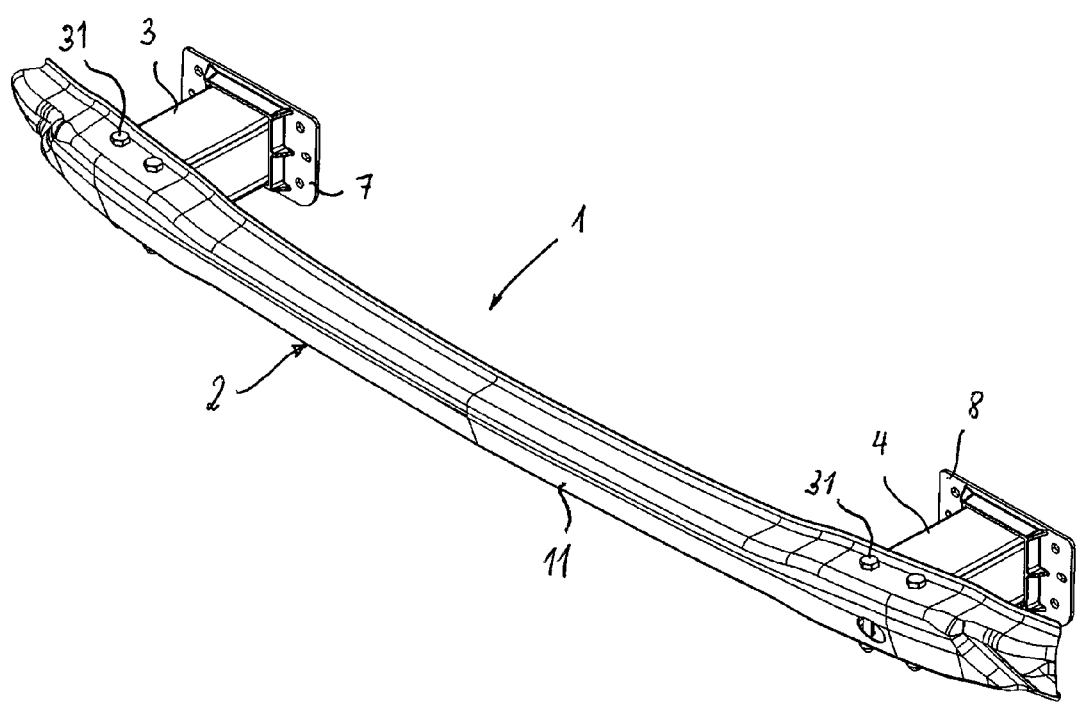
FIG. 1a is another top, front and side perspective view of the bumper of FIG. 1.

Securement of the outer shell member 10 is also realized by fastening bolts 31, as shown in FIG. 1a, so that the outer and inner shell members 9, 10 can jointly be fixed via aligned bores. The end portions 18, 19 of the inner shell member 10 are effectively clamped between the outer shell member 9 and the top side 27 and bottom side 28 of the crash boxes 3, 4. As best seen in FIGS. 2 and 5, the inner and outer shell members 9, 10 touch one another only in the area of the crash boxes 3, 4, i.e. in the attachment zone, whereby the end portions 18, 19 of the inner shell member 10 and the corresponding attachment zones 29 of the outer shell member 9 abut one another. The attachment zones 29 of the outer shell member 9 and the end portions 18, 19 of the inner shell member 10 have a same orientation so that the crash boxes 3, 4 are able to substantially engage the end portions 18, 19 and the attachment zones 29. This ensures a steep force increase in the event of a collision.

The maximum height of the outer and inner shell members 9, 10 is determined primarily by the height of the crash boxes 3, 4 so that the height of the outer shell member 9 may correspond to the configuration of the inner shell member 10 and the outer shell member 9 thus may have a midsection 30 of a height H1 (FIG. 5) which is smaller than a height in the area of the crash boxes 3, 4. The difference in height over the entire length thereof is hereby smaller than the difference in height of the inner shell member 9.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper for a motor vehicle, comprising a cross member disposed transversely to side rails of a motor vehicle frame and connected to the side rails via crash boxes, wherein the cross member has a C-shaped cross section and includes an outer shell member and an inner shell member, with the inner shell member constructed as tension link which is made of a material having a tensile strength which is greater than a tensile strength of a material of the outer shell member, wherein the inner and outer shell members touch one another only in an area of the crash boxes.

2. The bumper of claim 1, wherein the inner shell member is made of steel material and the outer shell member is made of lightweight metal.

3. The bumper of claim 2, wherein the outer shell member is made of aluminum.

4. The bumper of claim 2, wherein the outer shell member is made of plastic.

5. The bumper of claim 1, wherein the inner shell member is made of super high strength steel.

6. The bumper of claim 1, wherein the inner shell member has a central length portion which runs between the crash boxes and extends over a major part thereof at a distance to the outer shell member.

7. The bumper of claim 1, wherein the inner shell member has a generally C-shaped configuration, defined by a web, which confronts the outer shell member, and opposite legs, which are connected to the web and angled in a direction to the crash boxes, said legs embracing the crash box and respectively connected to a top side and a bottom side of the crash boxes.

8. The bumper of claim 1, wherein the inner shell member has a central length portion, which is defined by a height, and end portions for attachment of the inner shell member to the crash boxes, wherein the height of the central length portion is smaller than a height of the end portions.

9. The bumper of claim 8, wherein the inner shell member has a transition zone extending between the central length portion and each of the end portions, said transition zone being defined by a height which gradually increases from the central length portion to the end portions.

10. The bumper of claim 8, wherein the central length portion defines a transverse center plane, wherein the height of the central length portion doubles in size from the transverse center plane to the end portions.

11. The bumper of claim 1, wherein the inner shell member is received completely within the outer shell member.

12. The bumper of claim 9, wherein the inner shell member has a generally C-shaped configuration, defined by a web, which confronts the outer shell member, and opposite legs, which are connected to the web, wherein the web of the inner shell member is formed in an area of each of the end portions with an opening which extends to the transition zone and has a rounded configuration in an area proximal to the central length portion so that each of the end portions is forked to define an upper arm and a lower arm.

13. The bumper of claim 12, wherein the upper and lower arms have ends which are interconnected by a vertical link.

14. The bumper of claim 1, wherein the outer shell member has a midsection extending between the crash boxes and defined by a height which is smaller than a height in an area of the crash boxes.

15. The bumper of claim 1, wherein the inner shell member has a length dimension which is shorter than a length dimension of the outer shell member.

16. The bumper of claim 1, wherein the outer shell member has attachment zones which embrace the end portions of the inner shell member, and further comprising fastening bolts jointly connecting the inner and outer shell members to the crash boxes.

* * * * *